United States Patent
Soroker et al.

(10) Patent No.: US 8,352,920 B2
(45) Date of Patent: *Jan. 8, 2013

(54) TESTING AND DEBUGGING FRAMEWORK FOR APPLICATION BUILDERS

(75) Inventors: Danny Soroker, Larchmont, NY (US); Netta M. Shani, Haifa, IL (US)

(73) Assignee: International Business Machines Corporation, Armonk, NY (US)

( * ) Notice: Subject to any disclaimer, the term of this patent is extended or adjusted under 35 U.S.C. 154(b) by 1296 days.

This patent is subject to a terminal disclaimer.

(21) Appl. No.: 12/107,593

(22) Filed: Apr. 22, 2008

(65) Prior Publication Data

US 2008/0201687 A1     Aug. 21, 2008

Related U.S. Application Data

(63) Continuation of application No. 10/314,933, filed on Dec. 9, 2002, now Pat. No. 7,415,698.

(51) Int. Cl.
*G06F 9/44* (2006.01)
*G06F 11/00* (2006.01)

(52) U.S. Cl. .................... 717/130; 717/125; 714/35

(58) Field of Classification Search ............... 717/125, 717/130; 714/35

See application file for complete search history.

(56) References Cited

U.S. PATENT DOCUMENTS

| | | | | |
|---|---|---|---|---|
| 4,989,132 | A * | 1/1991 | Mellender et al. | 717/139 |
| 5,613,098 | A * | 3/1997 | Landau et al. | 714/38.1 |
| 5,911,073 | A | 6/1999 | Mattson, Jr. et al. | |
| 6,042,614 | A | 3/2000 | Davidson et al. | |
| 6,158,049 | A | 12/2000 | Goodwin et al. | |
| 6,526,567 | B1 | 2/2003 | Cobbett et al. | |
| 6,754,888 | B1 * | 6/2004 | Dryfoos et al. | 717/127 |
| 6,895,578 | B1 * | 5/2005 | Kolawa et al. | 717/130 |
| 6,938,245 | B1 | 8/2005 | Spertus et al. | |
| 6,993,749 | B2 * | 1/2006 | Bates et al. | 717/124 |
| 7,281,242 | B2 * | 10/2007 | Inamdar | 717/158 |
| 2002/0065911 | A1 | 5/2002 | von Klopp et al. | |
| 2002/0087948 | A1 | 7/2002 | Dzoba | |
| 2002/0129336 | A1 | 9/2002 | Bolding et al. | |
| 2002/0129337 | A1 | 9/2002 | Evans et al. | |
| 2004/0006765 | A1 | 1/2004 | Goldman | |
| 2004/0031019 | A1 | 2/2004 | Lamanna et al. | |

* cited by examiner

*Primary Examiner* — Li B Zhen
*Assistant Examiner* — Ryan Coyer
(74) *Attorney, Agent, or Firm* — Scully, Scott, Murphy & Presser, P.C.; William Stock, Esq.

(57) ABSTRACT

An application builder system and methodology enables a user to create an application using a builder ("builder application"); interactively edit the builder application by adding and removing application objects; interactively edit the properties of the application objects, including a new property called "debug level"; interactively set values of parameters for a code generator, including the value of a new parameter called "debug level"; invoking the code generator to automatically generate application code; and running the resulting generated application.

10 Claims, 5 Drawing Sheets

Development Process

System Architecture

Development Process

Example 1 -- GUI Builder

Example 2 -- Flow Builder

TESTING AND DEBUGGING FRAMEWORK FOR APPLICATION BUILDERS

RELATED APPLICATIONS

This application is a continuation of U.S. Ser. No. 10/314,933, filed Dec. 9, 2002, the entire contents of which are incorporated herein by reference.

BACKGROUND OF THE INVENTION

1. Field of the Invention

The present invention relates generally to application development tools for computer applications, and particularly a method and system for an application builder that can optionally generate code used for debugging or testing purposes.

2. Description of the Prior Art

Application builders are software development tools that enable the development of computer applications at an abstraction level that is higher than writing source code. An application builder typically has a graphical user interface through which the developer interacts to create the higher-level representation of the application. The application builder has a code generator component that translates the high-level representation to a concrete representation, which is typically source code, which can then be compiled and run.

The higher level of abstraction offered by application builders makes them useful in tackling today's complex application development. However, the fact that the developer works at an abstraction level that is higher than source code can make debugging and testing harder, since debuggers work at the source code level.

The ability to have source code that is used only in "debug" mode is known in the art. For example, the preprocessor of C and C++ provides such a facility through #if and #ifdef statements, and having statements of the form "#ifdef DEBUG ..." in an application is common practice. However, having such a facility at the abstraction level of the application builder is not known in the art.

Within an application builder, having selective code generation is also known in the art. For example, the Rational Rose UML builder (http://www.rational.com/products/rose/index.jsp) lets the developer turn on and off code generation for any given object, where the typical use is to disable code generation for an object while it is still "half-baked". However, there is no logical grouping of the objects that are turned off and no easy way to toggle between generation and non-generation for a set of objects.

Also known in the art are various techniques for adding debug-specific objects within an application builder framework. However, all such known techniques require the developer to implement some non-trivial aspect of such objects.

Therefore, a need exists in the art for a simple mechanism that lets developers add debug-specific objects within an application builder at a high level of abstraction.

It would be highly desirable to provide a simple mechanism that lets software developers add debug-specific objects within an application builder at a high level of abstraction. Such a development tool should enable the effortless creation and employment of a dedicated debug object, or, advantageously enable any object that normally participates in an application to serve as a debug object.

SUMMARY OF THE INVENTION

The present invention is directed to a method and system for an application builder tool that can optionally generate code used for debugging or testing purposes. The invention provides a simple means to extend most existing application builders to support this additional functionality.

According to the principles of the invention, there is provided an application builder system and methodology comprising the steps of: (a) creating an application using a builder ("builder application"); (b) interactively editing the builder application by adding and removing application objects; (c) interactively editing the properties of said application objects, including a new property called "debug level"; (d) interactively setting values of parameters for a code generator, including the value of a new parameter called "debug level"; (e) invoking the code generator to automatically generate application code; and (f) running the resulting generated application. It should be understood that each of steps (b)-(f) may be performed multiple times.

Preferably, in a step (a), a developer starts working with the application builder by creating a new builder application or project. In step (b), the developer uses the application builder, typically through a graphical user interface, to add (and remove) application objects, which comprise the application. The properties (also known as attributes) of these application objects are edited in step (c). In particular, according to the present invention, the builder is augmented by having a "debug level" property for each application object. This property describes the version of the application in which the object participates. For example, if this property is set to "debug", then the developer intends for the corresponding object to participate only in the debug version of the application, not the final version. On the other hand, if the debug level is "final", then the object participates in both the debug and the final applications. Note that the "debug level" property may take on many values. In step (d), the developer sets values of code-generation parameters. Here, too, the invention augments the builder by specifying a "debug level" parameter for code generation. In step (e), the code generator is invoked with the specified parameter values to generate a running application. For example, if the "debug level" parameter is set to "debug", then code for all objects is generated, whereas if the "debug level" parameter is set to "final", then debug objects are ignored by the code generator, and no code is generated for them. In step (f), the resulting application is run, possibly by the developer, or by an end user.

Advantageously, the system and method according to the invention addresses the need to provide debugging and testing capabilities for application builders that work at the level provided by the builder for building an application. The mechanism described is generic, and can be used to enhance existing application builders to provide a powerful, high level debugging capability at the "visual source" level.

BRIEF DESCRIPTION OF THE FIGURES

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
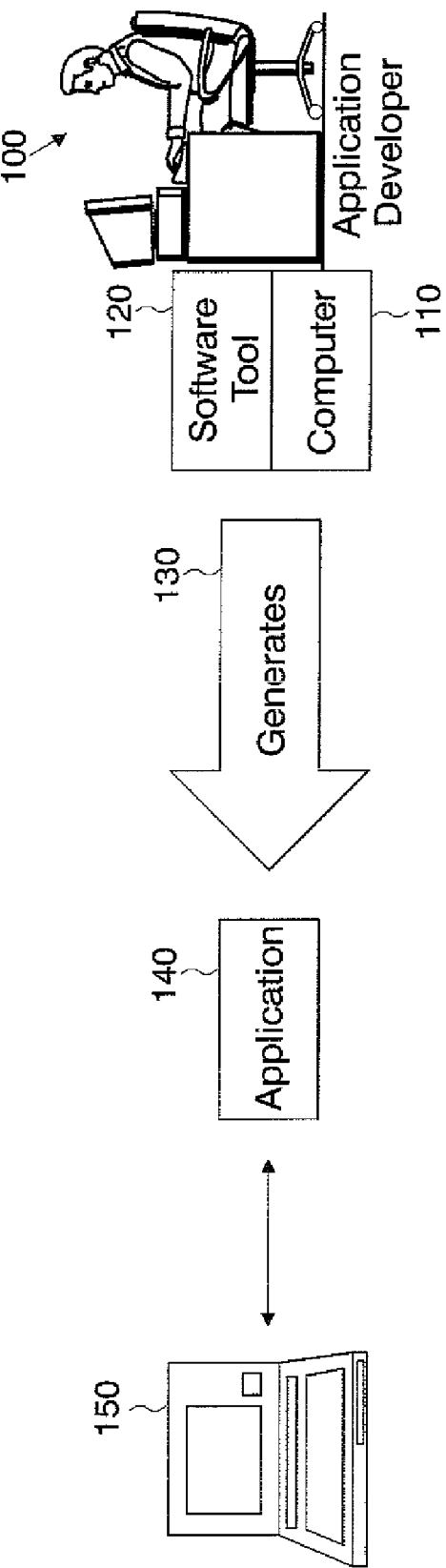
FIG. 1 illustrates a system context for running the testing and debugging framework for application builder tools according to the invention.

FIG. 1 illustrates a system context for running the testing and debugging framework for application building tools according to the invention. An application developer (100) uses a computer system (110), which is running a software tool (120), such as WebGain VisualCafe (previously Symantec VisualCafe), and like application builders. The software tool (120) is the application builder, which is used by the application developer to build applications using high-level abstractions. This application builder is extended to embody the methodology for conditionally generating debug-specific elements that are contained within applications as described in this disclosure. The application builder has a code-generation component (130), which is employed to generate an application (140) that is run on a target computer (150), which may be the same as the computer (110) used by the application developer. The generated application (140) may contain debug-specific elements, depending on the value of a parameter specified for the code generator (130).

Figure 2:
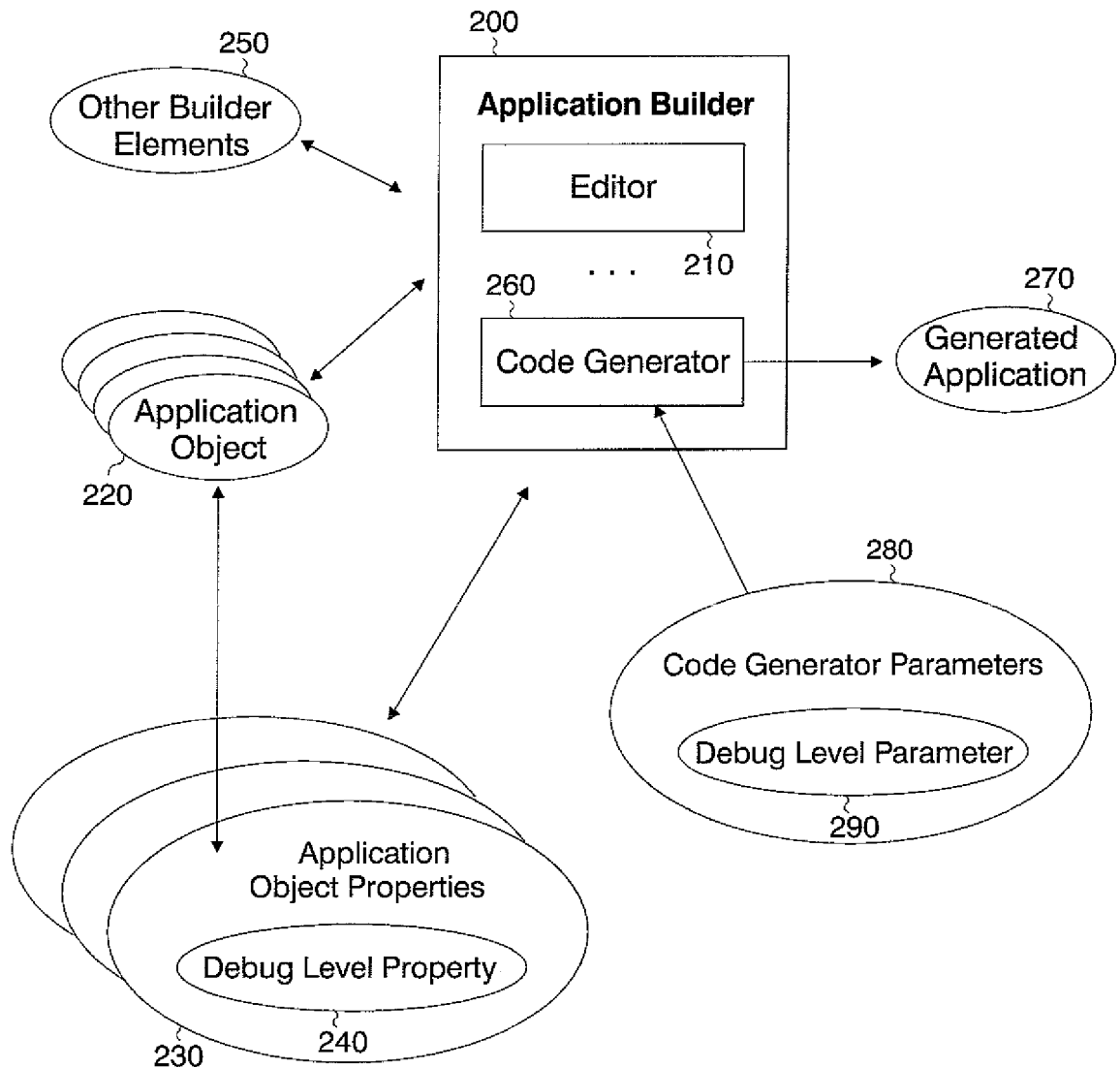
FIG. 2 is a system architecture diagram illustrating the testing and debugging framework for application builder tools according to the invention.

FIG. 2 is a system architecture diagram illustrating the testing and debugging framework for application builder tools extended in accordance with the present invention. The application builder (200) is a system that contains various components including: an editor (210) that is employed by the developer to create and edit a set of application objects (220) that comprise the application. Each application object has a corresponding list of properties (230), also known as attributes. The current invention extends the list of properties to include a "debug level" property (240). This property indicates whether the corresponding object is part of the end application, or if it is used only for debugging purposes (and should be omitted from the end application). Preferably, the editor (210) provides a visual indication of the debug level of the application objects. For example, the editor may display all the debug objects with a certain color, and may have functionality that enables hiding or revealing of the debug objects. The application builder (200) typically has other builder elements (250) to support its functions, besides the application objects.

Another component that may be either part of the builder or external to the builder is the code generator component (260) whose role is to generate a concrete application (270) from the high-level application constructed in the builder. The code generator takes as input the application objects (220) and their properties (230). Additionally, there may be a set of code generation parameters (280) used by the code generator to affect the generation process, typically specified by the developer. According to this invention, this set is extended to include a "debug level" parameter (290) that determines the debug level of the generated application (270). For example, if this parameter is set to "debug", then all the application objects (220) are included in the generated application. On the other hand, if the parameter is set to "final", then debug objects are omitted from the generated application.

Figure 3:
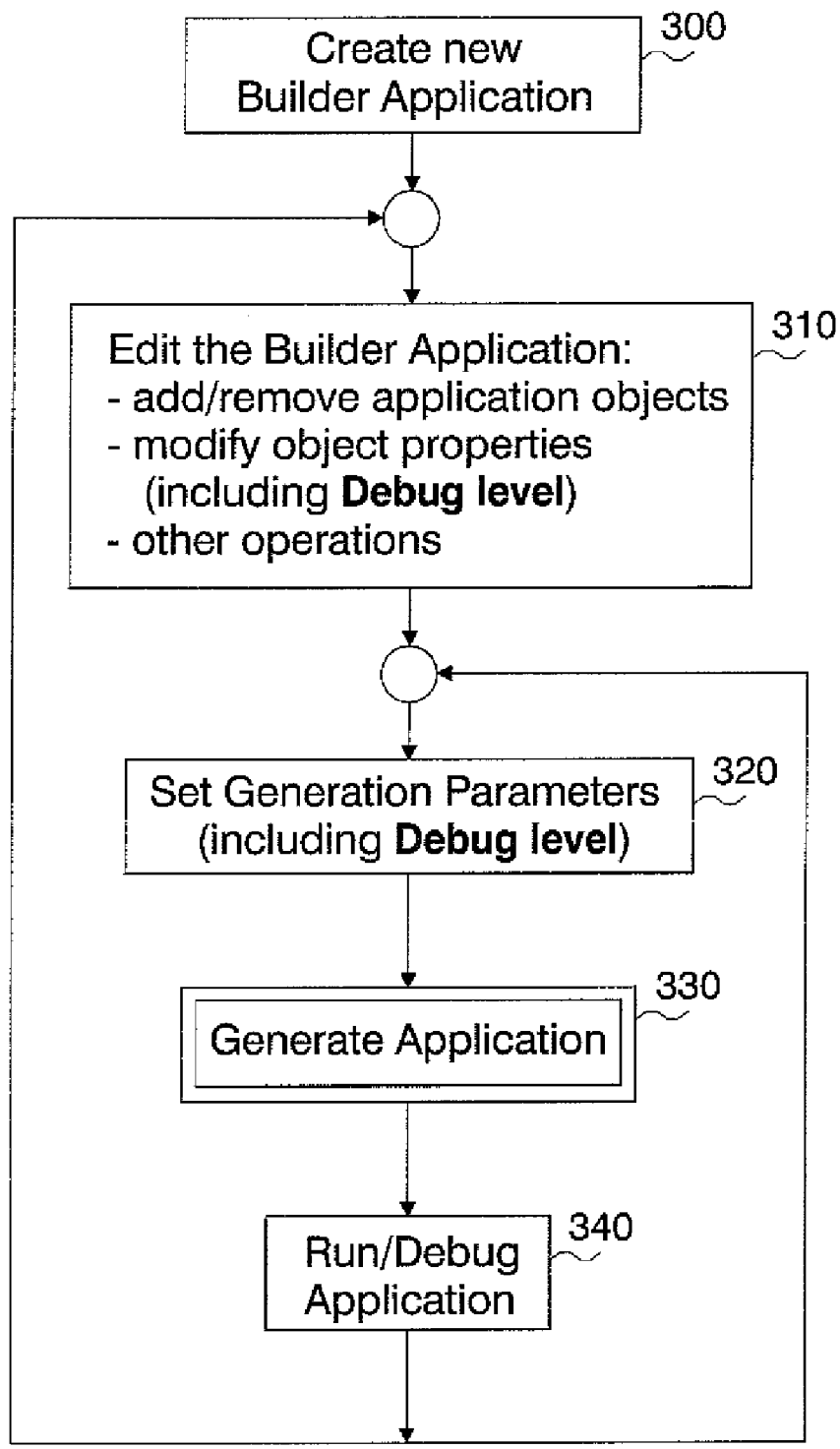
FIG. 3 is a development methodology employed by an application developer and the computer system using the method for application building according to the invention.

FIG. 3 is a development methodology employed by an application developer and the computer system using the method for application building according to the invention.

The starting point is typically to create a new builder application or project (300) within the application builder system. Then, the developer uses the builder (typically using the editor (210) and/or other GUI components) to edit the builder application (310). Typical operations at the application building step include, but are not limited to: adding or removing application objects and to edit their properties, as well as other operations. According to the current invention, one of the operations is to mark an object as a "debug" object. Following this work, the developer sets the parameter values for code generation (320), one of which is the debug level. Then the code generator is invoked (330) to generate the application. Note that the generated application may be a "clean" or "final" one, or may be a "debug" one. After running the application (340), the developer may choose to resume editing the high-level representation by returning to step (310), or to modify the code generation parameters (320) and re-generate a different flavor of the application.

Figure 4:
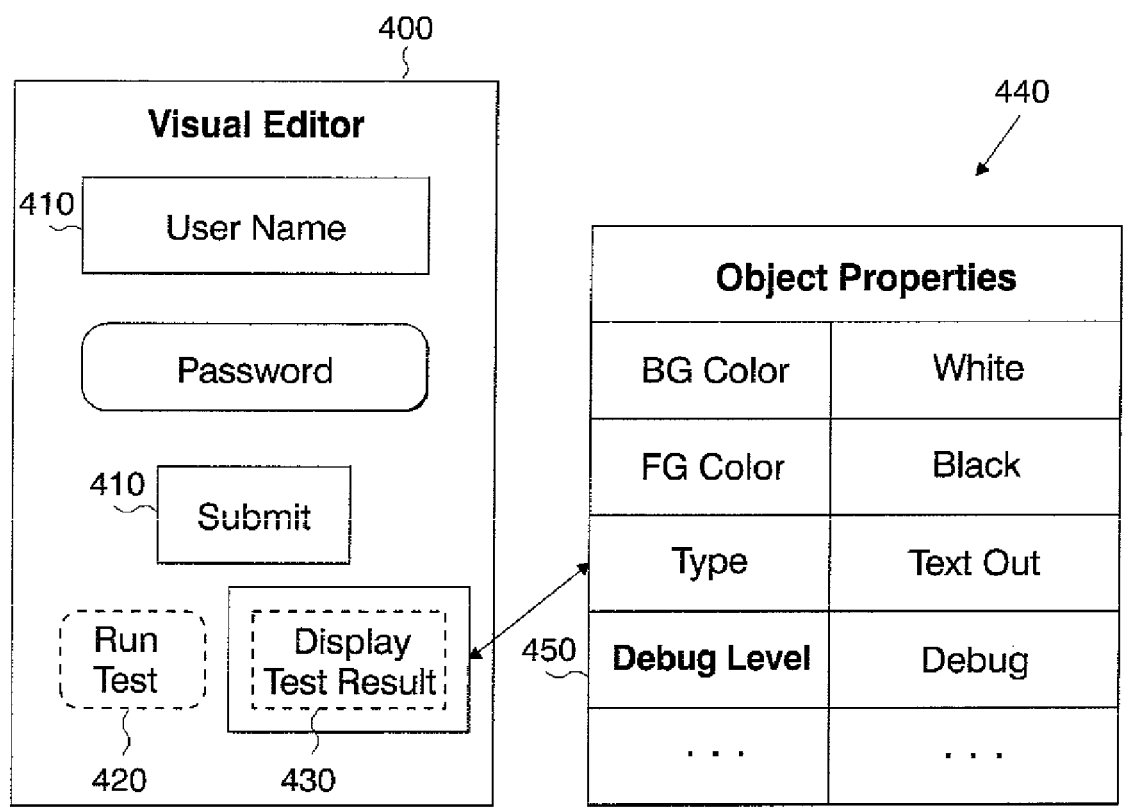
FIG. 4 depicts an example of a GUI builder component of an application building tool extended with aspects of the testing and debugging framework according to the invention; and, FIG. 5 depicts an example of a flow builder component of an application building tool extended with aspects of the testing and debugging framework according to the invention.

FIG. 4 depicts an example of a GUI builder component of an application building tool extended with aspects of the testing and debugging framework according to the invention. The main view of the visual editor (400) is the interface with which the developer creates GUI objects (410) such as Text box inputs and buttons or other GUI "widgets" (e.g., icons). According to the invention, some of these objects include, but not limited to, debug objects such as a "Run Test" object (420) or display Test Result object (430). In the example shown in FIG. 4, the editor displays such objects with a thick dashed border. When the developer selects an object (430), its properties are shown, and can be edited, in a properties editor portion (440) of the GUI, which is typically a table editor showing the property name in the left column and its value next to it in the right column. In this example, the selected object's "debug level" property (450) is set to "debug", which is why it is displayed as a debug object within the editor. In this example, if a "debug" application is generated, then it will include all five (5) interaction elements or "widgets" depicted in the editor (400) as shown in FIG. 4, whereas if a "final" application is generated, it will include only the three (3) "widgets" respectively labeled "User Name", "Password" and "Submit". It should be understood that the "debug level" property value may be Boolean. In this case, builder objects will have the property "is debug", which will be either true or false. When code is generated in debug mode, all of the objects will be created. However, when code is generated in non-debug mode, only the objects for which the debug property is false are created.

Figure 5:
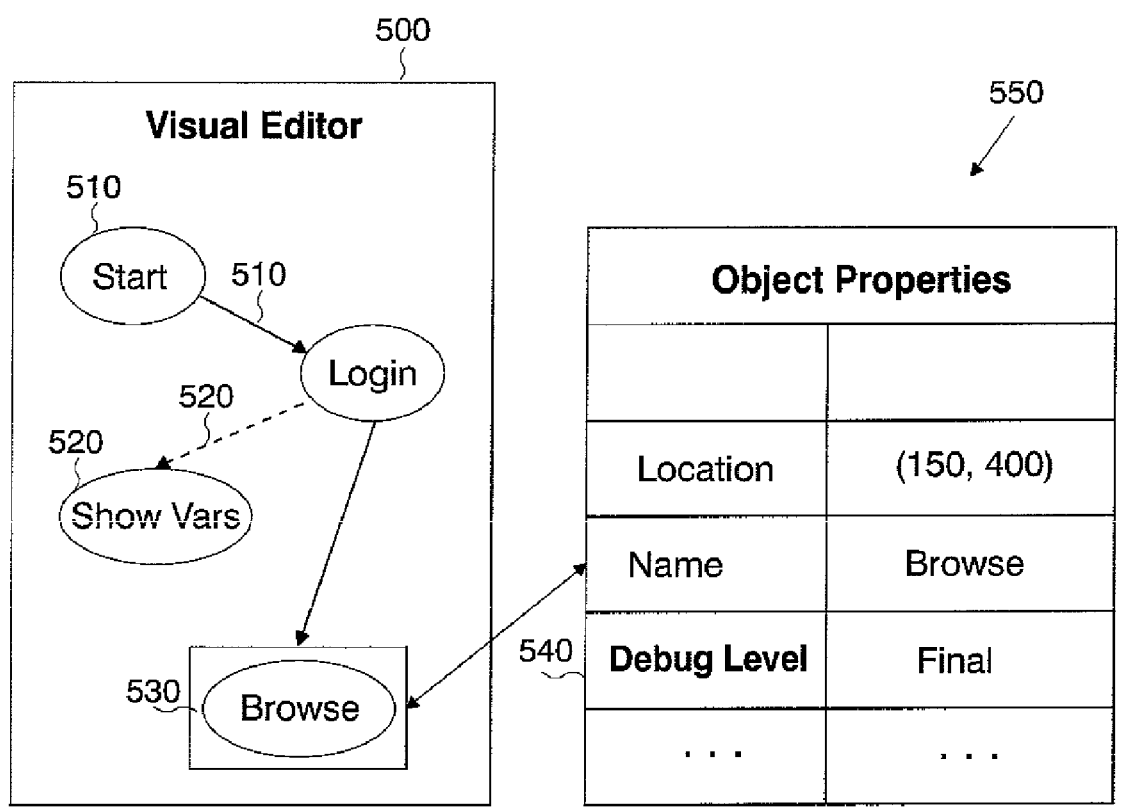

FIG. 5 depicts an example of a flow builder component of an application building tool extended with aspects of the testing and debugging framework according to the invention. The main view of the visual editor (500) is an interface for constructing an application flow graph including nodes and arcs (510) linking application steps. According to the invention, some of these may include debug objects (520). In the example depicted, debug objects may be displayed with a "dashed" pattern such as debug object (420) entitled "Show Vars" which enables viewing of certain program information such as the value of variables. Thus, as shown in FIG. 5, the selected object (530) is not a debug object, so its "debug level" property (540) is set to "final", as shown in the properties editor column (550). In this example, if a "debug" application is generated, then it will contain all four (4) nodes and three arcs, whereas if a "final" application is generated, then it will contain the nodes respectively labeled "Start", "Login" and "Browse", and the arcs between them.

Thus, in a visual builder context, if a developer wants to view certain program information (such as the values of some variables) when debugging and testing an application, then according to the invention, the programmer may define a builder object, for which "is debug" is set to be true. This object corresponds to a text area widget, which displays the desired information. Thus, when generating "debug" code, the resultant application will display the desired information (in the text widget), but the end-user application (generated in non-debug mode) will be free of such an artifact. It is understood that this feature may also be used for invoking actions, not just viewing information. For example, a debug-enabled button may be added that, when selected, invokes some operation that is needed for testing.

This invention may be used by developers in various methodologies. Two sample methodologies are as follows. It is understood that objects that are intended to participate in a final (non-debug) application are referred to as "real objects".

1. The developer creates the real application. When testing/debugging it, the developer adds additional (non-real) objects that specifically serve for debugging purposes and generates code in debug mode. Examples of this approach are described herein.
2. The developer creates the real application. When testing/debugging it, the developer "disables" parts of the application by changing the corresponding real objects to be debug objects, and generates code in non-debug mode.

It is noted that the second usage must be performed with care, since the semantics of the real application may be affected in unexpected ways.

It is fully understood that the present invention while described in terms of a debugging application is additionally applicable for testing purposes as well. Thus, in the context of testing, as one often sets up a suite of tests, the extended application building tool and methodology may be used to set up such a test suite. For example, if the "debug level" is set as an integer, then tests may be set up so that elements specific to test N have debug level N (where N is an integer). In such a system, it may be preferable to use the term "test configuration number" rather than "debug level".

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

The invention claimed is:

1. An application building tool for building a software application comprising:
  a computer processor coupled to a random-access memory;
  an editor component for creating and editing a set of application objects, each application object including application object properties, one of said application object properties including a debug level property capable of being set to indicate participation of said object in a debug version;
  a code generator component for generating an application capable of being executed from a high-level application constructed out of said application objects, said code generator component implementing a set of code generation parameters extended to include a debug level parameter for determining a debug level of the generated application,
  whereby if a debug level parameter is set, then all the application objects are included in the generated application, otherwise, if the debug level parameter is not set, then debug objects having debug level property set, are omitted from the generated application.

2. The application building tool as claimed in claim 1, wherein said debug level property is a Boolean value.

3. The application building tool as claimed in claim 1, wherein said debug level property is an integer value, and said application objects included in the generated application are those whose debug level matches the debug level parameter used by said code generator.

4. The application building tool as claimed in claim 1, wherein an application object having a debug level property set enables viewing of program information in a display device.

5. The application building tool as claimed in claim 4, wherein program information displayed includes values of variables implemented in the built program.

6. The application building tool as claimed in claim 1, wherein an application object having a debug level property set enables display of a debug level button which may be selected by a user to invoke a test or debug activity.

7. The application building tool as claimed in claim 1, wherein the editor component provides a visual indication of the debug level of the application objects on a display device.

8. The application building tool as claimed in claim 1, wherein said editor component is a visual editor, said application building tool further including a GUI builder component providing a user interface to enable a user to create GUI objects, said objects including one or more of text box inputs or buttons.

9. The application building tool as claimed in claim 1, wherein said application building tool further includes a flow builder component providing a user interface to enable a user to create an application flow graph including nodes and arcs linking application steps.

10. A non-transitory medium readable by a machine, embodying a program of instructions to perform a method for building a software application utilizing an application building tool, said method comprising:
  a) creating and editing a set of application objects, each application object including application object properties, one of said application object properties including a debug level property capable of being set to indicate participation of said object in a debug version;
  b) generating an application capable of being executed from a high-level application constructed out of said application objects;
  c) implementing a set of code generation parameters including a debug level parameter for determining a debug level of the generated application, and
  d) including all the application objects in the generated application if a debug level parameter is set, or, if the debug level parameter is not set, omitting debug objects having debug level property set from the generated application.

* * * * *